No. 771,075.                                            Patented September 27, 1904.

UNITED STATES PATENT OFFICE.

COSMO KENDALL, OF UPPER NORWOOD, ENGLAND.

SEPARATION OF MINERAL SUBSTANCES BY MEANS OF THE SELECTIVE ACTION OF OIL.

SPECIFICATION forming part of Letters Patent No. 771,075, dated September 27, 1904.

Application filed July 21, 1903. Serial No. 166,484. (No specimens.)

*To all whom it may concern:*

Be it known that I, COSMO KENDALL, a subject of the King of Great Britain and Ireland, residing at Upper Norwood, in the county of Surrey, England, have invented Improvements in the Separation of Mineral Substances by Means of the Selective Action of Oil, of which the following is a specification.

According to this invention crushed graphite-containing material—for example, graphite ore or graphite waste—is mixed with water and brought intimately into contact or thoroughly mixed with pure thin oil—as, for example, kerosene or paraffin oil—which adheres to and by reason of its levity separates the graphitic substance (this may be more or less pure graphite) from associated rocky matter, which by reason of its weight and non-affinity to oil sinks in and is conveniently carried off by the water. The graphitic substance is or may be afterward separated from the oil and the latter is or may be used again in subsequent similar operations. In separating graphitic substances in this way I do so or may do so by means of apparatus and in the manner that I will now describe. The crushed graphite-containing material mixed with water and oil is supplied to an agitator or mixer adapted to produce a thorough mixing of the materials under the action of gravity alone, and from this agitator or mixer the mixture passes in the form of a thin sheet or thin sheets or the like (preferably annularly and horizontally) and at a considerable velocity into a vessel, which is initially filled with water or water and oil and is of such a shape and has the material discharged into it in such a position as to enable water and rocky matter or gangue to pass off at an outlet or outlets at or near the bottom and the oil to carry the graphitic substance up with it to the surface, whence the mixture flows off to have the graphitic substance separated from foreign matter, including it may be the oil, in any suitable manner.

In one example of the treatment of graphite-containing material according to this invention the apparatus is employed that is shown diagrammatically in the accompanying drawings, whereof—

Figure 1:
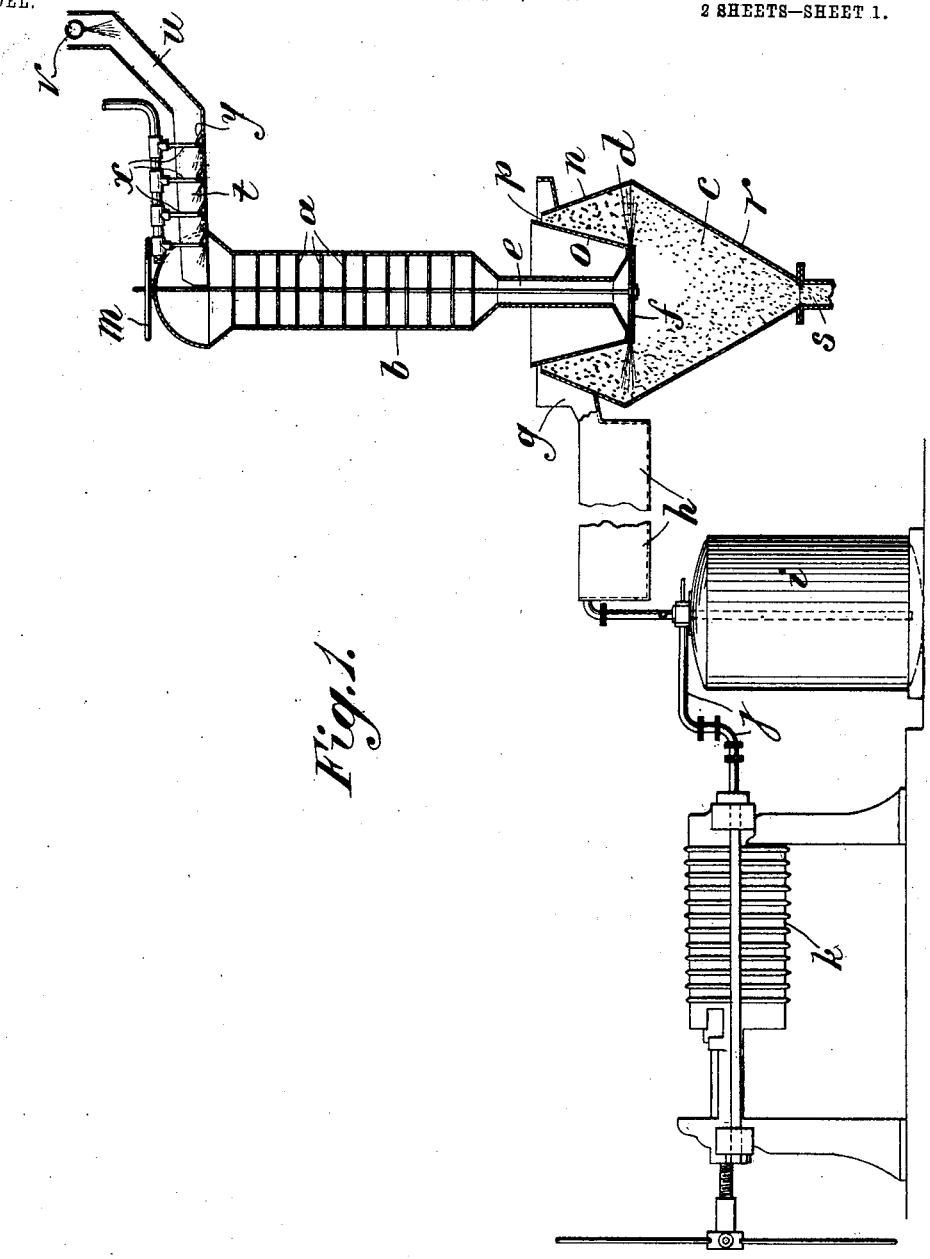
Figure 2:
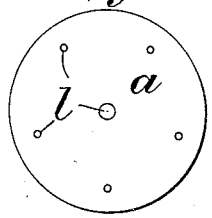
Figure 3:
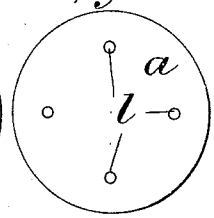
Figure 4:
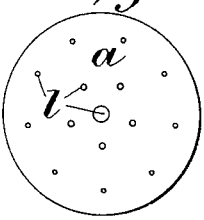
Figure 5:
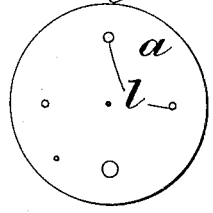
Figure 6:
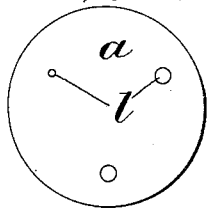
Figure 7:
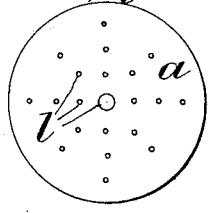
Figure 8:
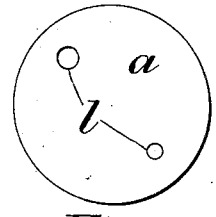
Figure 9:
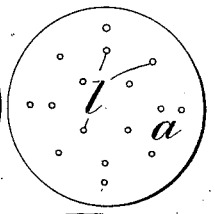
Figure 10:
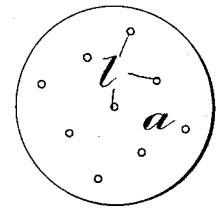
Figure 11:
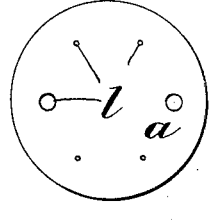
Figure 12:
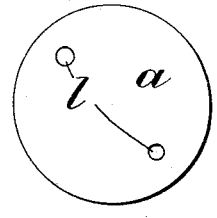
Figure 13:
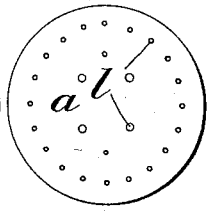

Figure 1 is a diagrammatical general sectional elevation of the apparatus, and Figs. 2 to 13, inclusive, are plans of twelve disks used therein.

The crushed material mixed with water and oil is supplied to an agitator or mixer comprising a number of disks or other plates $a$, perforated or made foraminous and horizontally disposed, spaced apart, and fixed within a vertical casing $b$. Below the agitator or mixer there is a vat $c$, containing water, into which the mixture is projected in a thin horizontal annular sheet $d$ from a vertical pipe $e$, the lower end of which is, say, twenty-four inches below the top of the vat and is provided with a valve-like device $f$, by means of which at the bottom of the pipe $e$ an annular outlet of, say, twenty-four inches in diameter is formed and which can be adjusted in depth by means of a hand-wheel $m$ to vary the cross-sectional area of the outlet. The oil and the graphitic substance carried by it rise to the surface of the water in the vat and flow over the rim of the vat into an inclined launder $g$, from which they flow into a settling-tank $h$, (or series of settling-tanks or into a vessel similar to that above described.) From the settling tank or tanks the surface matter flows into a closed receptacle $i$, whence it can be forced by means of compressed air through a pipe $j$ into a filter-press $k$. The plates $a$ of the agitator or mixer have their perforations so arranged and shaped that different portions of the materials will be caused to flow at different rates within the agitator or mixer, and will consequently become thoroughly mixed.

Figs. 2 to 13, inclusive, are plans of the twelve disks employed in the apparatus shown and show relative sizes and an arrangement of the perforations $l$ thereof by means of which the effect desired can be attained. The total area of the perforations $l$ in each disk $a$ is equal to the cross-sectional area of the narrowest portion of the pipe plus an amount necessary to compensate for friction. The vat $c$ is so shaped that inclined surfaces $n$ and $o$ deflect the ascending oily matter into a constricted annulus $p$ of, say, a diameter of forty-eight inches and a width of an inch and a half, and another inclined surface $r$ deflects the falling water and rocky matter or gangue toward an outlet $s$, which is centrally arranged and is, say, forty-eight inches below the bottom of the pipe $e$. The oil may be mingled with the material to be treated as it is borne to the top of the agitator or mixer through a channel $t$ by a sufficiency of water supplied to it in a conduit $u$, as through perforations in a pipe $v$, the oil passing into the mixture through a number of fine orifices arranged to discharge beneath the moving mass of material. The oil may thus be supplied by a number of pipes $x$, which are at right angles to the direction of flow of the material and have perforations to discharge the oil in the same direction as that of the material and each of which has behind it an inclined plane $y$, adapted to direct the material to be treated slightly upward and over the perforations of the corresponding oil-pipe $x$. The rocky matter or gangue issuing from the vat may be passed to another and similar agitator or mixer for like treatment if necessary. The remaining oil in the cakes of the filter-press may be partly or wholly displaced by a subsequent water wash, and thereby partly or wholly recovered.

It will be understood that the dimensions hereinbefore stated may be varied in accordance with the quantity of material to be treated in a given time, and they are given only by way of example, having been found suitable in practice.

What I claim is—

1. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil, as kerosene or paraffin oil, projecting at a considerable velocity the mixture so produced under the surface of a volume composed of said material, water, and oil, allowing oil and graphitic substance adhering thereto to pass upward to said surface, and drawing off from said surface oil and graphitic substance immediately on arrival at said surface.

2. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil, as kerosene or paraffin oil, projecting horizontally or substantially horizontally the mixture so produced under the surface of a volume composed of said material, water, and oil, allowing oil and graphitic substance adhering thereto to pass upward to said surface, and drawing off from said surface oil and graphitic substance immediately on arrival at said surface.

3. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil, as kerosene or paraffin oil, projecting at a considerable velocity the mixture so produced under the surface of a volume composed of said material, water, and oil, allowing oil and graphitic substance adhering thereto to pass upward to said surface, drawing off from said surface oil and graphitic substance immediately on arrival at said surface, and forcing matter so drawn off into a filter-press so as to recover oil.

4. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil, as kerosene or paraffin oil, projecting horizontally or substantially horizontally the mixture so produced under the surface of a volume composed of said material, water, and oil, allowing oil and graphitic substance adhering thereto to pass upward to said surface, drawing off from said surface oil and graphitic substance immediately on arrival at said surface, and forcing matter so drawn off into a filter-press so as to recover oil.

5. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil as kereosene or paraffin oil, projecting in the form of a thin sheet and at a considerable velocity the mixture so produced under the surface of a volume composed of said material, water, and oil, allowing oil and graphitic substance adhering thereto to pass upward to said surface, and drawing off from said surface oil and graphitic substance immediately on arrival at said surface.

6. The hereinbefore-described process for the treatment of finely-divided material for the separation of graphitic substance contained therein from associated rocky matter or gangue, consisting in mixing said material with water, bringing said material intimately into contact or thoroughly mixing it with suitable pure thin oil, as kerosene or paraffin oil, projecting horizontally or substantially horizontally in the form of a thin sheet and at a considerable velocity the mixture so produced under the surface of a volume composed of said material, water, and oil, allowing oil and graphitic substance adhering thereto to pass upward to said surface, and drawing off from said surface oil and graphitic substance immediately on arrival at said surface.

Signed at London, England, this 10th day of July, 1903.

COSMO KENDALL.

Witnesses:
H. D. JAMESON,
A. NUTTING.